United States Patent [19]

Moyer et al.

[11] Patent Number: 4,875,735
[45] Date of Patent: Oct. 24, 1989

[54] SEATBACK RECLINER MECHANISM

[76] Inventors: George A. Moyer, 70355 Hilltop La., Union, Mich. 49130; Chung L. Chang, 15737 Garfield Ave., No. 17, Paramount, Calif. 90723

[21] Appl. No.: 595,473

[22] Filed: Mar. 30, 1984

[51] Int. Cl.⁴ .............................................. B60N 1/06
[52] U.S. Cl. ..................................... 297/367; 297/366
[58] Field of Search ............... 297/366, 367, 368, 369, 297/370, 371, 361, 362, 378, 379, 354, 355

[56] References Cited

U.S. PATENT DOCUMENTS

| | | |
|---|---|---|
| 2,153,998 | 2/1937 | Verderber et al. |
| 2,336,013 | 12/1943 | Hamilton .............................. 297/367 |
| 3,156,004 | 11/1964 | Strien et al. |
| 3,507,000 | 4/1970 | Strien et al. |
| 3,608,128 | 9/1971 | Faust . |
| 3,788,698 | 1/1974 | Perkins . |
| 3,840,268 | 10/1974 | Johudrow et al. ................... 297/366 |
| 3,902,757 | 9/1975 | Yoshimura . |
| 3,931,996 | 1/1976 | Yoshimura .......................... 297/366 |
| 3,966,253 | 6/1976 | Berghof et al. ...................... 297/367 |
| 3,973,288 | 8/1976 | Pickles . |
| 3,999,247 | 12/1976 | Cremer . |
| 4,103,964 | 8/1978 | Klingelhöfer et al. . |
| 4,178,037 | 12/1979 | Pickles ................................ 297/379 |
| 4,223,947 | 10/1976 | Cremer . |
| 4,314,729 | 2/1982 | Klueting . |

FOREIGN PATENT DOCUMENTS

| | | | |
|---|---|---|---|
| 51819 | 8/1974 | Australia ............................. 297/367 |
| 0006610 | 1/1980 | European Pat. Off. ............ 297/367 |
| 2845545 | 4/1980 | Fed. Rep. of Germany ...... 297/367 |
| 3027629 | 2/1982 | Fed. Rep. of Germany ...... 297/367 |
| 747800 | 4/1956 | United Kingdom ................ 297/367 |
| 1342371 | 1/1974 | United Kingdom ................ 297/366 |

Primary Examiner—Peter R. Brown
Attorney, Agent, or Firm—Barnes & Thornburg

[57] ABSTRACT

A hinge fitting for a reclining vehicle seat structure comprises a fixed support bracket, a seatback member, a locking member, and a lock actuating mechanism. The lock actuating mechanism includes a cam with two cam arms to move the locking member into locking and un-locking positions. The shape and positioning of the cam result in a hinge fitting that is resistant to unlocking in response to a force applied to the seatback. The operator for the lock actuating mechanism is mounted remotely from the intersection of the seat and seatback.

16 Claims, 1 Drawing Sheet

SEATBACK RECLINER MECHANISM

BACKGROUND AND SUMMARY OF THE INVENTION

The present invention relates generally to hinge fittings for a reclining vehicle seat structure and, more particularly, to a novel design and arrangement of the lock actuating mechanism for such a seat structure.

Vehicle seats are generally designed for simultaneous forward and rearward adjustment of the seat and seatback members. Other adjustments (e.g., vertical or tilt) of both seat and seatback members, as a unit, may or may not be provided. However, it is often desirable to allow for adjustment of the seatback member, relative to the seat member, to provide an adjustably reclining seatback. Hinge fittings which provide for this type of adjustment normally include a fixed support bracket mounted to the vehicle seat, a seatback support member which is adjustable through a range of reclining positions and which is attached to the seatback and pivotably connected to the fixed support bracket, a locking member to lock the seatback support at various inclined positions, and a lock actuating mechanism for engaging or disengaging the locking member.

An example of hinge fittings of this general type is shown in U.S. Pat. No. 3,999,247 to Cremer. Refinements related to the specific shape and dimensional characteristics of the lock actuating mechanism, which in this patent is a cam, are shown in U.S. Pat. No. 4,223,947, also to Cremer. Another example of this general type of hinge fitting is shown in U.S. Pat. No. 3,973,288 to Pickles.

A problem with hinge fittings of the above-referenced type relates to the location of the lock actuating mechanism and its associated operating handle. When the handle is mounted directly to the pivotable shaft to which the lock actuating mechanism (i.e., the cam in the above-referenced patents) is normally mounted, the handle is relatively inaccessible and is often covered or interfered with by the vehicle seat belts.

Accordingly, it is an object of the present invention to provide a hinge fitting for a reclining vehicle seat structure which has an operating handle located remotely from the lock actuating mechanism.

Another object of this invention is to provide a lock actuating mechanism for a reclining seat hinge fitting which will engage and move the locking member to locking and unlocking positions with relatively little rotational movement of the lock activating mechanism or its associated operating handle.

A further object of this invention is to provide a lock actuating mechanism which, when subjected to a force transmitted by the locking member when the locking member is in the locking position, will tend to urge the locking member toward the locking position.

A still further object of this invention is to provide a hinge fitting which satisfies the above objectives and which is simple and inexpensive to manufacture and install while still providing reliable and smooth operational service.

These and other objectives are achieved in a hinge fitting for a reclining vehicle seat structure which comprises a fixed support bracket, a seatback support member pivoted to the fixed support bracket and adjustable through a range of inclined positions, a locking member pivoted to the support bracket for locking the seatback support member in a desired position, and a lock actuating mechanism for moving the locking member to a locking and an unlocking position. The lock actuating mechanism includes a cam which has a first cam arm to cam the locking member to the locking position and a second cam arm to cam the locking member to the unlocking position. The camming surface on the first cam arm engages the locking member at an engagement point, when the locking member is in the locking position, such that a force applied to the cam by the locking member at the engagement point tends to pivot the cam in a direction which causes the first cam arm to urge the locking member toward the locking position. In a preferred embodiment of the invention, the camming surface on the first cam arm is parabolic in shape. In an especially preferred embodiment of the invention, the lock actuating mechanism includes an operating handle which is mounted near the end of an elongated portion of the support bracket and connected to the cam by a rigid wire rod.

Other objects, advantages and novel features of the present invention will become apparent from the following detailed description of the invention when considered in conjunction with the accompanying drawings.

DETAILED DESCRIPTION OF THE DRAWINGS

Figure 1:
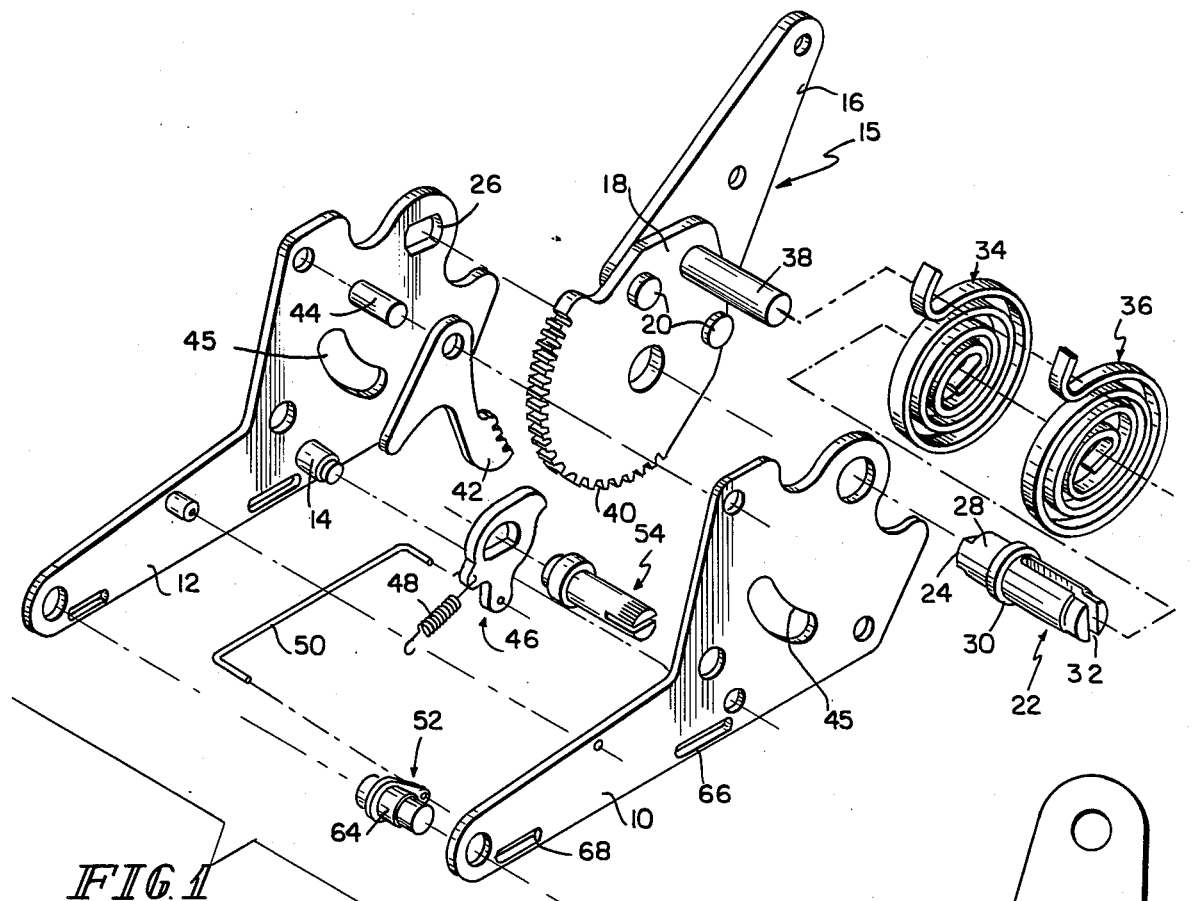
FIG. 1 is an exploded perspective view of a hinge fitting for a reclining vehicle seat constructed in accordance with a preferred embodiment of the invention.

Referring now to the drawings there is illustrated a preferred embodiment of a hinge fitting for a reclining vehicle seat structure. Referring specifically to FIG. 1, the structure includes a fixed support bracket which comprises plate members 10 and 12, which are fastened together and spaced apart by suitable fastening means 14. The seatback support member 15 is comprised of upper portion 16, which is adapted for mounting to the vehicle seatback, and lower portion 18 which is rigidly connected by fasteners 20 to upper portion 16. Lower portion 18 is mounted for movement between plates 10 and 12 by a pin, shown generally at 22. Pin 22 has an end portion 24 which has a flat side which coacts with hole 26 in plate 12 to keep pin 22 from turning. In addition, pin 22 has pivot portion 28, shoulder portion 30 and slotted portion 32. Slotted portion 32 is adapted to receive springs 34 and 36 which coact with post 38, mounted on lower portion 18, to bias seatback support member 15 toward an upright position.

Lower portion 18 of seatback support member 15 has an arcuate peripheral section 40, which is generally concentric with the axis of pin 22 and which has teeth disposed thereon. These teeth are engaged by matching teeth on pawl 42, which serves to lock seatback support member 15 in adjusted position. Pawl 42 is pivotably mounted between plates 10 and 12 by pivot pin 44. A gear view slot 45 is provided in plate 10 to allow for visual observation of teeth engagement during assembly.

Figure 2:
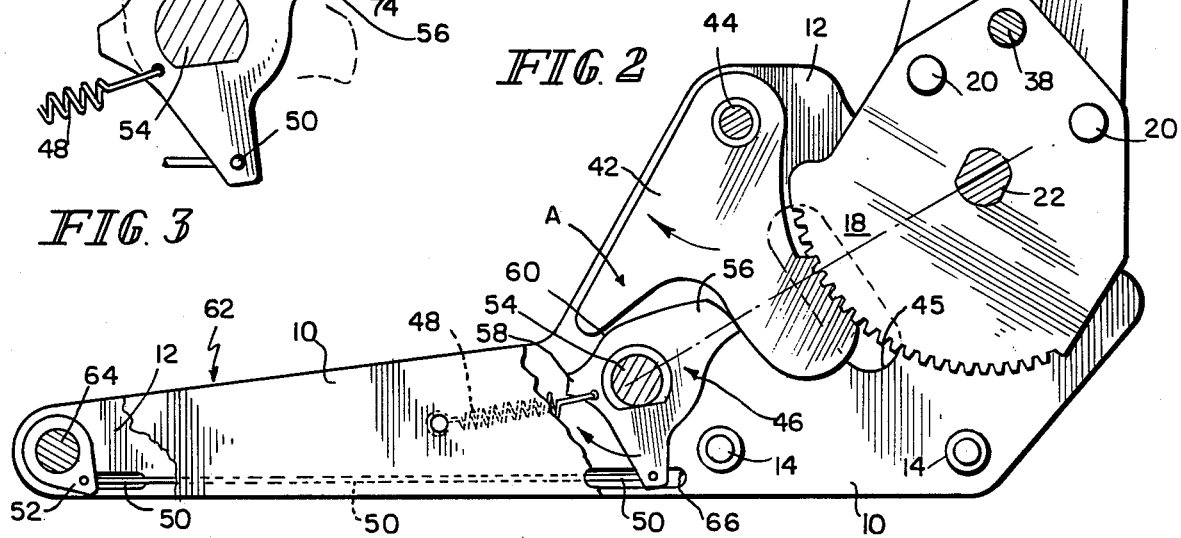
FIG. 2 is a side view showing the hinge fitting of an assembled condition.

The actuating mechanism which moves pawl 42 into the locking and unlocking positions comprises a cam 46, a spring 48, a connecting rod 50, and an operator 52. Operation of this mechanism is best understood by reference to FIG. 2. In FIG. 2, cam 46 is shown holding pawl 42 in the locking position (i.e., the teeth of pawl 42 are engaged with the teeth on lower portion 18 of seatback support member 15). Cam 46, which is pivotably mounted between plates 10 and 12 by pivot pin 54, has a first cam arm 56 which engages pawl 42 to move and hold pawl 42 into this position. Cam 46 is biased by spring 48, also mounted between plates 10 and 12, in a counterclockwise direction (as shown in FIG. 2), to ensure that pawl 42 returns to and remains in locking position when the hinge fitting is not being adjusted. Connecting rod 50 is attached to cam 46 at a point which lies on the other side of the center of cam rotation from the point where spring 48 is attached. Thus, when a pulling force is applied to connecting rod 50, cam 46 is rotated in a clockwise direction to disengage first cam arm 56 from pawl 42 to allow movement of pawl 42 to the unlocking position. Cam 46 has a second cam arm 58 which engages pawl 42 at point 60 for positive displacement to the unlocking position.

The radial spacing of cam arms 56 and 58 can be selected to reduce (or increase) the amount of rotational movement of cam 46 which is required to move pawl 42 from the locking to the unlocking position. For example, if cam arm 58 s moved closer (in the clockwise direction) to cam arm 56, the distance from cam arm 58 to pawl 42 (when pawl 42 is in the locking position) will be decreased and, upon rotation of cam 46, cam arm 58 will contact pawl 42 sooner for movement to the unlocking position with less required rotation of cam 46 and, correspondingly, operator 52.

As noted, one end of connecting rod 50 is attached to cam 46 to provide for application of a pulling force to cam 46, causing it to rotate in a clockwise direction (as viewed in FIG. 2). The other end of connecting rod 50 is attached to operator 52 which is pivotably mounted between plates 10 and 12 at a point which is near the end of elongated portion 62 of plates 10 and 12. An end of pivot pin 64 is suitable shaped to receive an operating handle or lever 65 to allow for rotational movement of operator 52 and, via connecting rod 50, cam 46. Connecting rod 50 is preferably formed from a relatively rigid wire rod. One end of the wire rod is crimped, or bent, to allow the rod end to pass through a hole in cam 46 and to extend into first guide slot 66 which is located adjacent to pivot pin 54 in either plate 10 or plate 12. The other end is similarly crimped to pass through operator 52 and into second guide slot 68 which is located adjacent to pivot pin 64 in either plate 10 or plate 12.

The length of elongated portion 62 is selected to conveniently locate operator 52, and its associated operating handle or lever, at a position distant from the seatback pivot point. This allows for more convenient access to the handle and avoids entanglement with the vehicle seat belts which are often attached to the vehicle near the intersection of the seat and seatback. In the embodiment illustrated in FIG. 2, the distance from the center of cam pivot pin 54 to the center of operator pivot pin 64 is approximately 6 inches.

Figure 3:
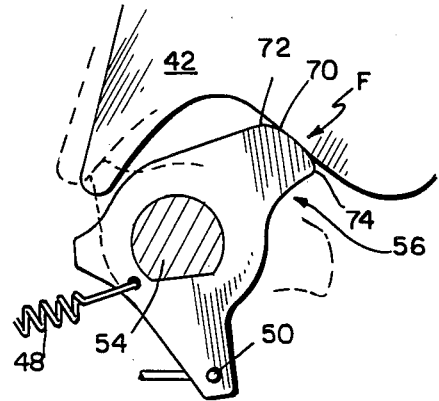
FIG. 3 is an enlarged view of Detail A in FIG. 2.

An additional aspect of the lock actuating mechanism will be discussed by reference to FIG. 3. FIG. 3 shows an enlarged view of Detail A which is the area of engagement between first cam arm 56 and pawl 42 when pawl 42 is in the locking position. Application of force to seatback support member 15 can cause pawl 42 to transmit a force, represented in FIG. 3 by arrow F, to cam 46. Force F acts perpendicularly to the point of contact between cam 46 and pawl 42. To ensure that force F does not move pawl 42 toward the unlocking position, camming surface 70 is shaped such that force F imparts a movement of rotation to cam 46 that tends to rotate cam 46 in the counter-clockwise direction (as viewed in FIG. 2), so that cam 46 tends to urge pawl 42 toward the locking position in response to the application force F. For this to occur, force F must lie on a line which passes above the center of pivot pin 54, as viewed in FIG. 2. A camming surface shape which facilitates this result is one that is parabolic between points 72 and 74. With this shape, the radius of curvature of surface 70 constantly increases as measured from point 72 to point 74 with respect to the center of pivot pin 54. Thus, as pawl 42 is moved into the locking position, the line of action of force F is more quickly brought into a position which lies above the center line of pivot pin 54 to produce the anti-unlocking effect described above.

From the preceding description of the preferred embodiments, it is evident that the objects of the invention are attained. Although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A hinge fitting for a reclining vehicle seat structure comprising:

fixed support means;

a seatback support member pivotally connected to said fixed support means by a first pivot means for movement from an upright position rearwardly through a range of rearwardly inclined positions;

a locking member pivotally connected to said fixed support means by a second pivot means for fixing said seat back support member in adjusted position throughout the range of rearwardly inclined positions;

lock actuating mean for moving said locking member to a locking and to an unlocking position, said locking means including a cam pivotally connected to said fixed support means by a third pivot means, said cam having a first cam arm engageable with said locking member to cam said locking member into said locking position, said cam having a second cam arm engageable with said locking member to cam said locking member into said unlocking position;

said lock actuating means including anti-unlocking means for preventing movement of said locking member out of said locking position in response to forces applied to said seatback support member; and said anti-unlocking means including a camming surface on said first said cam arm which engages said locking member at an engagement point when said locking member is in said locking position such that a force acting perpendicularly at said engagement point tends to pivot said cam such that said first cam arm urges said locking member towards said locking position.

2. Structure as defined in claim 1, wherein said camming surface is a generally parabolic surface.

3. A hinge fitting for a reclining vehicle seat structure comprising:

fixed support means;
a seatback support member pivotally connected to said fixed support means by a first pivot means for movement from an upright position rearwardly through a range of rearwardly inclined positions;
a locking member pivotally connected to said fixed support means by a second pivot means for fixing said seat back support member in adjusted position throughout the range of rearwardly inclined positions;
lock actuating means for moving said locking member to a locking and to an unlocking position, said locking means including a cam pivotally connected to said fixed support means by a third pivot means, said cam having a first cam arm engageable with said locking member to cam said locking member into said locking position, said cam having a second cam arm engageable with said locking member to cam said locking member into said unlocking position;
said lock actuating means including anti-unlocking means for preventing movement of said locking member out of said locking position in response to forces applied to said seatback support member; and
said lock actuating means further including operating means, pivotally connected to said fixed support means by a fourth pivot means and connected to said cam by connection means, for moving said cam into engagement with said locking member.

4. Structure as defined in claim 3, wherein said operating means is connected to said fixed support means by said fourth pivot means near an end of an elongated portion of said fixed support means.

5. Structure as defined in claim 3, wherein said connection means is a rigid wire rod.

6. Structure as defined in claim 3, wherein said connection means engages a first guide slot formed in said fixed support means adjacent to said fourth pivot means, and wherein said connection means engages a second guide slot formed in said fixed support means adjacent to said third pivot means.

7. A hinge fitting for a reclining vehicle seat structure, comprising:
fixed support means comprising first and second plate members connected by fastener means in spaced apart, generally parallel relation;
a seatback support member mounted between said first and second plate members on a first pivot means for movement from an upright position rearwardly through a range of rearwardly inclined positions to a reclining position;
a locking member mounted between said first and second plate members on a second pivot means for fixing said seatback support member in an adjusted position throughout said range of rearwardly inclined positions;
lock actuating means mounted between said first and second plate members on a third pivot means for positively engaging and disengaging said locking member between locking and unlocking positions; and
operating means connected to at least one of said first and second plate members on a fourth pivot means at a location remote from said lock actuating means and connected to said lock actuating means to provide leverage to actuation of said lock actuating means by rigid connection means.

8. Structure as defined in claim 7, wherein said connection means is a rigid wire rod.

9. Structure as defined in claim 7, wherein said fourth pivot means is located near an end of an elongated portion of said at least one of said first and second plate members.

10. Structure as defined in claim 7, wherein said connection means engages a first guide slot formed in said at least one of said first and second plate members adjacent to said fourth pivot means, and wherein said connection means engages a second guide slot formed in said at least one of said first and second plate members adjacent to said third pivot means.

11. Structure as defined in claim 7, wherein said lock actuating means includes a cam having a first cam arm engageable with said locking member to cam said locking member into said locking position, and having a second cam arm engageable with said locking member to cam said locking member into said unlocking position.

12. Structure as defined in claim 11, wherein a camming surface on said first cam arm engages said locking member at an engagement point when said locking member is in said locking position such that a force acting perpendicularly at said engagement point tends to pivot said cam such that said cam urges said locking member toward said locking position.

13. Structure as defined in claim 12, wherein said camming surface is a generally parabolic surface.

14. Structure as defined in claim 11, wherein said cam is biased by a spring toward said locking position.

15. Structure as defined in claim 11, wherein said first cam arm and said second cam arm are spaced apart radially by at least 90°.

16. A hinge fitting for a reclineable vehicle seat structure, comprising:
a fixed support means;
a seatback support member pivotally connected to said fixed support means;
pawl means connected to said fixed support means and independently pivotable relative to said seatback support member to engage and retain said seatback support member in selected positions with respect to said fixed support means;
cam means connected to said fixed support means and independently pivotable relative to said pawl means to positively engage, disengage and retain said pawl means in selected positions with respect to said seatback support member;
rigid, elongated connection means pivotally attached at one end to said cam means at a position offset from the pivotal axis of said cam means so as to permit positive leverage actuation of said cam means by linear motion of said connection means;
operator means pivotally attached to another end of said connection means to provide linear motion of said connection means by rotation of said operator means; and
said cam means including anti-unlocking means for preventing disengagement of said pawl means with said seatback support means in response to forces applied to said seatback support means, said anti-unlocking means including a parabolic surface for engagement with said pawl means such that forces exerted on said cam means by said pawl means through the point of engagement urge said cam means to pivot towards a position that locks said pawl means into engagement with said seatback support member.

* * * * *

UNITED STATES PATENT AND TRADEMARK OFFICE
CERTIFICATE OF CORRECTION

PATENT NO. : 4,875,735
DATED : October 24, 1989
INVENTOR(S) : George A. Moyer and Chung L. Chang It is certified that error appears in the above-identified patent and that said Letters Patent is hereby corrected as shown below:

In column 3, at line 27, please delete "s" and insert therefor --is--.

In Claim 12, at line 26, please insert --first-- before cam urges.

Signed and Sealed this

Third Day of August, 1999

Attest:

Q. TODD DICKINSON

*Attesting Officer*     *Acting Commissioner of Patents and Trademarks*